(12) United States Patent
Sfaelos

(10) Patent No.: US 8,818,743 B2
(45) Date of Patent: Aug. 26, 2014

(54) ENERGY METER APPLICATION PROGRAMMING INTERFACE

(75) Inventor: Jimmy Sfaelos, Marietta, GA (US)

(73) Assignee: General Electric Company, Schenectady, NY (US)

( * ) Notice: Subject to any disclaimer, the term of this patent is extended or adjusted under 35 U.S.C. 154(b) by 439 days.

(21) Appl. No.: 13/224,208

(22) Filed: Sep. 1, 2011

(65) Prior Publication Data

US 2013/0060495 A1 Mar. 7, 2013

(51) Int. Cl.
*G06F 19/00* (2011.01)
*G01D 4/00* (2006.01)
*H04Q 9/00* (2006.01)

(52) U.S. Cl.
CPC .................. *G01D 4/004* (2013.01); *Y04S 20/40* (2013.01); *Y02B 90/242* (2013.01); *Y02B 90/245* (2013.01); *Y04S 20/322* (2013.01); *H04Q 2209/60* (2013.01); *H04Q 9/00* (2013.01)
USPC ........................................................... 702/62

(58) Field of Classification Search
CPC .......... G01D 4/004; G01R 22/10; G06F 8/67; H04L 29/06; H04L 67/34
USPC ...................................... 702/62, 64, 182–185
See application file for complete search history.

(56) References Cited

U.S. PATENT DOCUMENTS 7,085,824 B2 * 8/2006 Forth et al. ..................... 709/221

* cited by examiner

*Primary Examiner* — Edward Raymond
(74) *Attorney, Agent, or Firm* — Fletcher Yoder, P.C.

(57) ABSTRACT

An energy meter includes metering circuitry configured to monitor power consumption. The energy meter includes firmware including internal functions configured to control elements of the energy meter. Further, the energy meter includes an input/output port or a communications device configured to receive customized instructions and a processor. The processor controls the metering circuitry, receives customized instructions from the input/output port or the communications device. The customizable instructions provide additional control of the elements of the energy meter beyond the internal functions of the firmware. The processor interprets the customized instructions and executes the customized instructions using the internal functions of the firmware.

18 Claims, 3 Drawing Sheets

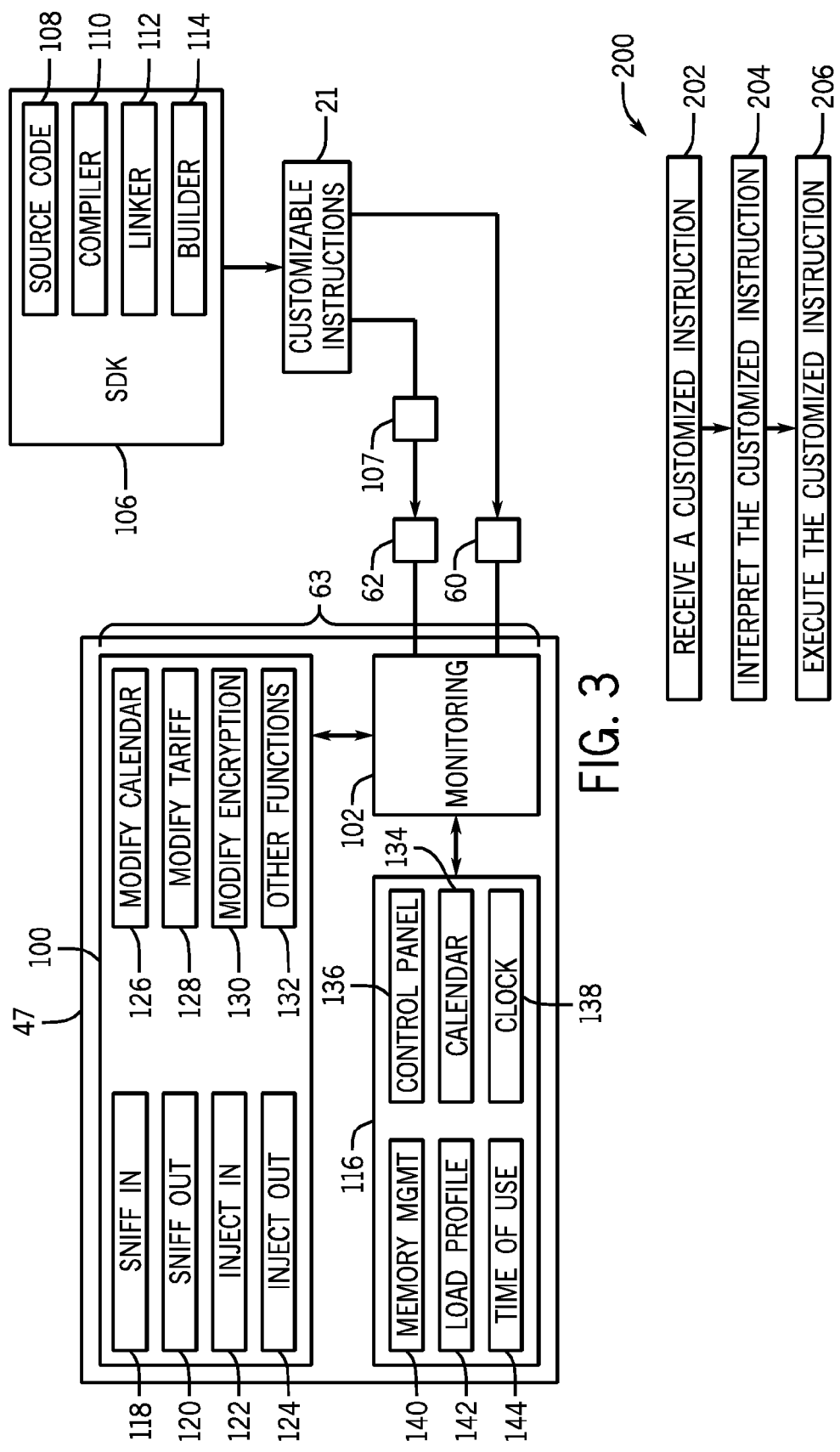

ENERGY METER APPLICATION PROGRAMMING INTERFACE

BACKGROUND OF THE INVENTION

The subject matter disclosed herein relates to an energy consumption monitoring system having customizable instruction capabilities Energy meters incorporate many functionalities relating to energy consumption measurement and monitoring. One energy meter make or model may be deployed by many utility companies to consumers. The utility companies may desire customizable configurations for their specific usage. For example, different utility companies may have varying localization data, billing schemes, etc. where energy meter customization might be useful. However, such customizations are often times limited by the firmware of the energy meter system. Thus, utility companies may have to work around the current meter firmware limitations or request a customized firmware version from the manufacturer.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, an energy meter includes metering circuitry configured to monitor power consumption. The energy meter also includes firmware configured to control the metering circuitry, an input/output port, and a processor. The processor is configured to receive customized instructions from the input/output port. The customized instructions provide additional control beyond internal functions of the firmware. The processor interprets the customized instructions and executes the customized instructions utilizing the internal functions of firmware.

In a second embodiment, a method for executing a customized instruction on an energy meter includes receiving, at an input/output port of the energy meter, the customized instruction. The method also includes interpreting the customized instruction via the energy meter and executing the customized instruction by utilizing internal functions of firmware.

In a third embodiment, an energy meter software development kit includes machine readable code configured to aid in creating customizable instructions. The customizable instructions are interpretable and executable by a processor of an energy meter.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3 is a block diagram of a customizable instruction metering system that includes an energy meter firmware with an application programming interface (API) and a software development kit (SDK) for creating customizable instructions that interface with the API, in accordance with an embodiment; and FIG. 4 is a flowchart of a process for executing customized instructions on an energy meter, in accordance with an embodiment.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Present embodiments relate to energy meters capable of implementing customizable instructions beyond the standard instructions provided in a firmware of the energy meters. Such customizable instructions may provide consumers with an energy meter that is more customizable to their specific requirements. The customizable instructions may be consumed by the energy meters and implemented through an application programming interface (API) residing in the energy meter's firmware. Further, a consumer, developer, or utility company may generate the customizable instructions through the use of a software development kit. In addition to improving consumer experience, the customizable instructions may also enhance the energy meter manufacturing process by requiring fewer firmware modifications for customizations that can be implemented through the API.

Figure 1:
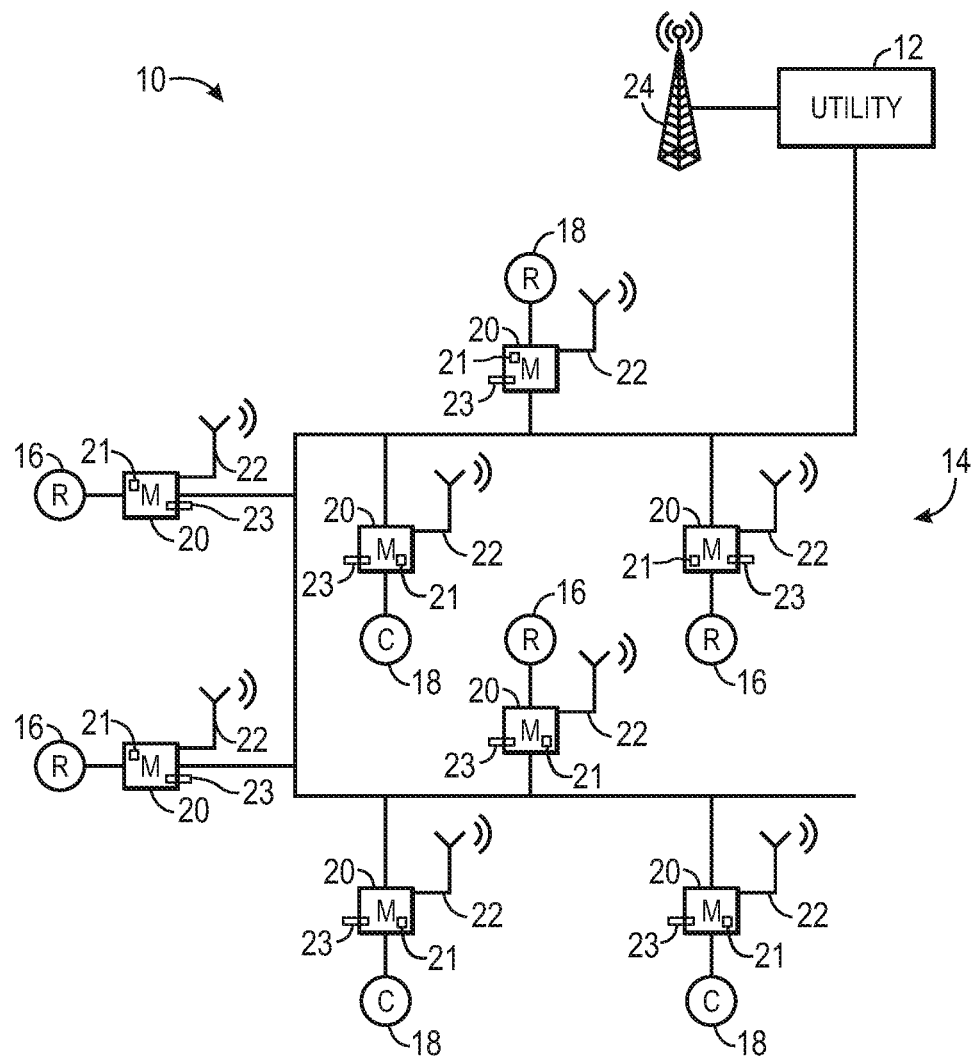
FIG. 1 is a block diagram of an electrical distribution system in which customizable instruction-enabled energy meters may monitor power consumption, in accordance with an embodiment.

With the foregoing in mind, FIG. 1 represents a block diagram of an electrical system 10, which includes a power utility 12 that supplies power to a power grid 14. Loads on the power grid may include, for example, residential establishments 16 and commercial establishments 18. The power consumption of the residential establishments 16 or commercial establishments 18 may be monitored by energy meters 20. As mentioned above and described in greater detail below, the customizable instruction-enabled energy meters 20 may detect, interpret, and execute customizable instructions 21 on the individual energy meters 20.

To execute the customizable instructions 21, the customizable instruction-enabled energy meters 20 may monitor power consumed by the residential establishment 16 or the commercial establishment 18 to which it is affixed. Additionally, the customizable instruction-enabled energy meters 20 may communicate with the power utility 12 via data communication links 22. Such data communication links 22 may be wired (e.g., over wired telecommunication infrastructure) or wireless (e.g., a cellular network or other wireless broadband, such as WiMax). Similarly, the power utility 12 may employ a communication link 24 to communicate with the various customizable instruction-enabled energy meters 20. The communication link 24 may be wired or wireless, as may suitable to communicate to the various communication links 22 of the energy meters 20. The customizable instruction-enabled energy meters 20 may obtain customizable instructions 21 over the power grid 14 or via input/output ports 23 on the energy meters 20 via the communication links 22 to the communication link 24 of the power utility 12. Based on the customizable instructions 21 provided via the power grid 14 or the input/output port 23, the customizable instruction-energy meters 20 may provide customized functionality.

Figure 2:
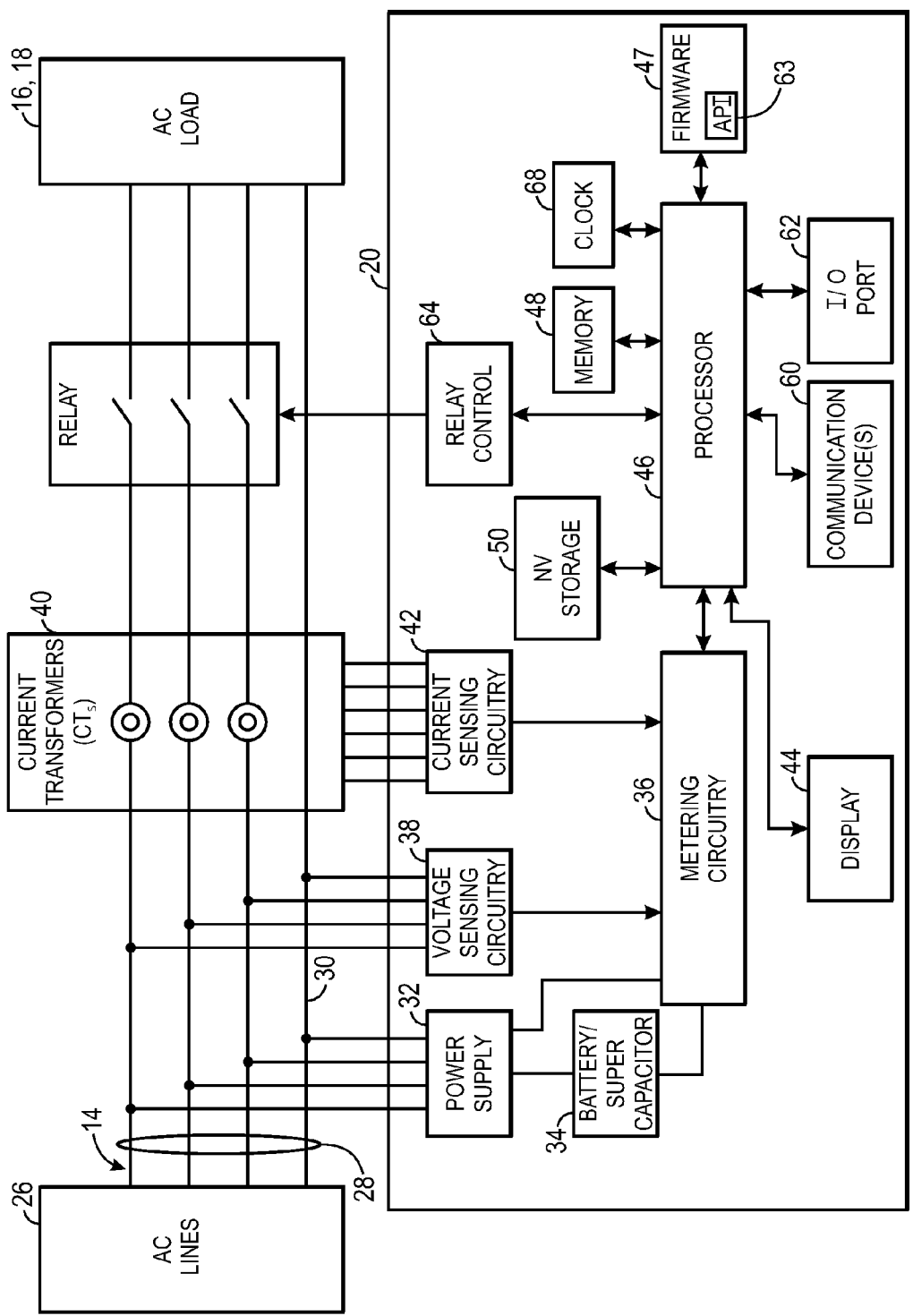
FIG. 2 is a block diagram of such a customizable instruction-enabled energy meter of FIG. 1, in accordance with an embodiment.

The customizable instruction-enabled energy meters 20 may take a variety of forms. One example of a three-phase energy meter 20 appears in FIG. 2 as joined to the power grid 14, as power flows from AC lines 26 to an AC load 16, 18 (e.g., a residential establishment 16 or a commercial establishment 18). Although the example of FIG. 2 involves monitoring three-phase power, alternative embodiments of the customizable instruction-enabled energy meter 20 may monitor single-phase power. In the illustrated embodiment, the AC lines 26 may transmit three-phase power via three phase lines 28 and a neutral line 30. The customizable instruction-enabled energy meter 20 may obtain power via power supply circuitry 32 that may couple to the three phase lines 28 and the neutral line 30 for its internal power consumption. To backup power consumption data in the event of a power outage, the power supply circuitry 32 may also charge a battery and/or super capacitor 34. In alternative embodiments, the backup power may be fed by a non-rechargeable battery.

Metering circuitry 36 may ascertain power consumption by monitoring the voltage and current traversing the AC lines 26 to the AC load 16, 18. In particular, voltage sensing circuitry 38 may determine the voltage based on the three phase lines 28 and the neutral line 30. Current transformers (CTs) 40 and current sensing circuitry 42 may determine the current flowing through the three phase lines 28. The metering circuitry 36 may output the current power consumption values to an electronic display 44, such as an LCD display, as well as to a processor 46. The metering circuitry 36 may sense the voltage and current inputs and send corresponding pulses to the processor 46, which obtains metering functionality instructions from a firmware 47. For example, the processor 46 may calculate the energy accumulation, power factor, active power, reactive power and maximum demand, etc. utilizing instructions on the firmware 47.

The processor 46 may include one or more microprocessors, such as one or more "general-purpose" microprocessors, one or more application-specific processors (ASICs), or a combination of such processing components, which may control the general operation of the energy meter 20. For example, the processor 46 may include one or more instruction set processors (e.g., RISC), audio processors, and/or other related chipsets. Memory 48 and nonvolatile storage 50 may store the current and/or certain historical power consumption values, as well as store the customizable instructions 21 to enable the processor 46 to execute the customized functionalities, as discussed in greater detail below.

As will be discussed in more detail below with regards to FIG. 3, a software development kit (SDK) 106 may be useful for generating the customizable instructions 21. After the customizable instructions 21 are generated, they may be stored in any suitable article of manufacture that includes one or more tangible, computer-readable media at least collectively storing the executed instructions or routines, such as, but not limited to, the memory devices and storage devices described below. The customizable instructions 21 may then be provided to the customized instruction-enabled energy reader 20 via the communications device 60 or the input/output port 62. These customized instructions 21 may be executed by processor 46 to enable the customizable instruction-enabled energy meter 20 to provide customized functionalities, including those described herein.

For example, the customizable instructions 21 to be processed by the processor 46 may be stored in the memory 48, which may include a volatile memory, such as random access memory (RAM); a non-volatile memory, such as read-only memory (ROM); or a combination of RAM and ROM devices, or may be stored internal to the processor 46 and/or metering circuitry 36. The memory 48 may store the firmware 47 for the energy meter 20, such as a basic input/output system (BIOS), an operating system, various programs, applications, or any other routines that may be executed on the customizable instruction-enabled energy meter 20, including user interface functions, processor functions, and so forth. The memory 48 may be optional if the processor 46 is capable of storing such information and/or firmware in its internal memory.

In addition, the nonvolatile storage 50 may be utilized for persistent storage of the customizable instructions 21. The nonvolatile storage 50 may include flash memory, a hard drive, or any other optical, magnetic, and/or solid-state storage media.

As mentioned above, the customizable instruction-enabled energy meter 20 may communicate with the power utility 12 to obtain customizable instructions 21 for the customizable instruction-enabled energy meter 20. Such communication may take place via one or more communication devices 60, which may include interfaces for a personal area network (PAN), such as a Bluetooth network, a local area network (LAN), such as an 802.11x Wi-Fi network, a wide area network (WAN), such as a 3G or 4G cellular network (e.g., WiMax), an infrared (IR) communication link, a Universal Serial Bus (USB) port, and/or a power line data transmission network such as Power Line Communication (PLC) or Power Line Carrier Communication (PLCC). Additionally, the customizable instruction-enabled energy meter 20 may include an input/output port 62, such as a removable memory device. The customizable instructions 21 may be provided to the customizable instruction-enabled energy meter 20 through the input/output port 62.

FIG. 3 is a block diagram of an embodiment a customizable instruction metering system that includes a firmware 47 with an API 63. Upon the customizable instruction-enabled energy meter 20 being provided with the customizable instructions 21 from the communications device(s) 60 and/or input/output port 62, the processor 46 may store the customizable instructions 21 in storage (e.g., memory 48 or the non-volatile storage 50). As will be discussed in more detail below, the processor 46 may communicate with an application programming interface (API) 63 built into the firmware 47. The API 63 may include a library 100 of functions that allow the customized instructions 21 to interface with elements 116 of the firmware 47.

The API 63 may include a library 100 of functions that may be invoked by the customizable instructions 21, to create customized functionalities on the customizable instruction-enable energy meter reader 20. The API 63 may also include a monitoring module 102 that detects customizable instructions 21 being input to the firmware 47 (e.g., through the communications port 60 or the input/output port 62).

The customizable instructions 21 may be generated from a software development kit 106. The software development kit 106 may include a variety of tools useful for developing the customizable instructions 21 for the firmware 47 API 63. For example, the software development kit 106 may include source code 108, a compiler 110, a linker 112, and a builder 114.

The source code 108 may include code snippets useful for development of the customizable instructions 21. The compiler 110 may transform code (e.g., the source code 108) into a language understandable by the API 63. The linker 112 may transform the output from the compiler 110 into an executable program. The builder 114 may provide a graphical user interface that allows the software development kit 106 user to visually develop the customizable instructions 21. For example, the builder 114, may include drag and drop instructions in a "what you see is what you get" manner in the builder 114.

The customizable instructions 21 may be stored on a storage medium 107 configured to interface with the input/output port 62 or may be provided to the customizable instruction-enabled energy meter 20 through the communications device 60. In embodiments where the customizable instructions are provided through the input/output port 62, the storage medium (e.g., a memory stick) may interface with the input/output port 62, and may provide the firmware 47 with the customizable instructions 21. In embodiments where the customizable instructions 21 are sent to energy meter 20 through the communication device 60, a wireless or wired network may be configured to transmit the customizable instructions 21.

The monitoring module 102 may detect the provided customizable instructions 21 and interpret the customizable instructions 21. For example, the monitoring module 102 may monitor a data stream flowing into the communications device 60 or the input/output port 62. The monitoring module 102 may detect that the incoming data stream includes customizable instructions 21, for example, by detecting a start flag in the data stream that signifies that customizable instructions follow. The monitoring module may determine the end of the customizable instructions by detecting an end flag in the data stream. After interpreting the customized instructions 21, the monitoring module 102 may access functions from the library 100 and control elements 116 of the firmware 47. Examples of functions in the library 100 may include a "sniff in" function 118, a "sniff out" function 120, an "inject in" function 122, an "inject out" function 124, a "modify calendar" function 126, a "modify tariff" function 128, a "modify encryption" function 130, and many other functions 132.

The "sniff" functions (e.g., 118 and 120) may provide functionality to detect a specific marker in communications being sent to or from the customizable instruction-enabled energy meter 20 and trigger additional functionality when the marker is detected. For example, the "sniff in" 118 function may detect a specific string of text (e.g., "marker") being sent to the energy meter 20. Upon detecting the string of text (e.g., "marker"), the firmware API 63 may trigger additional functionality (e.g., instructions described in the customizable instructions 21). The "sniff out" function 120 may detect a marker in an outgoing communication from the energy meter 20. For example, the "sniff out" function 120 may detect a specific string of text (e.g., "marker") in an outgoing communication. The firmware API 63 may trigger additional functionality (e.g., instructions described in the customizable instructions 21) upon detecting the specific string of text.

The library 100 may also include "inject" functions. The "inject in" function may allow the customizable instructions 21 to inject data into a communication being sent to the energy meter 20. The "inject out" function may allow the customizable instructions 21 to inject data into a communication being sent from the energy meter 20. In certain embodiments, the "inject" functions may be useful for injecting tags into the communications sent to and from the energy meter 20. In one example, the tags may provide a destination for the communications sent from energy meter 20. Further, the "inject" functions may be useful to inject specific data strings that symbolize a status of the energy meter 20. For example, the customized instructions 21 may provide instructions to insert a bellwether data string periodically, signifying that the energy meter 20 is operating properly.

In some instances, it may be useful for an energy meter 20 consumer to be able to modify certain functionalities of the firmware. Thus, the library 100 may include "modify" functions. For example, the "modify calendar" function may be useful in creating an additional calendar arrangement above and beyond the calendar element 134 of the firmware 47. For example, the calendar element 134 may be programmed to provide only a Gregorian calendar. The "modify calendar" function 126 may enable the production of additional calendar functionality, such as providing a lunar or other non-Gregorian calendar functionality. In some instances it may be useful for an energy meter consumer to modify the tariffs for billing calculations. For example, the tariffs may represent variations in billing rates based upon the time of usage. In low demand time periods it may be desirable to have a lower billing rate than during high demand time periods. However, energy meter consumers may desire to customize the tariff algorithms for their own specific tariff calculations. The "modify tariff" function 128 may be useful for creating such customized tariff calculations. Further, in certain scenarios, an energy meter 20 consumer may desire to modify an encryption method for communications sent to and from the energy meter 20. For example, the consumer may have a proprietary encryption methodology that it wishes to implement when communicating with the energy meter 20. The "modify encryption" function 130 may be useful in supplementing or replacing any encryption method found in the energy meter 20.

Elements 116 that may interface with the functions in the library 100 may include the calendar element 134, a control panel element 136, a real-time clock element 138, a memory management element 140, a load profile element 142, and/or a time of use element 144. The elements 116 may be accessed or in cases modified by the functions in the library 100 in conjunction with the customizable instructions 21. For example, in one embodiment, the calendar element 134 may provide a Gregorian-style calendar for the firmware 47. The calendar element 134 may be provided to the "modify calendar" function 126, which may allow customizations of the calendar element 134 (e.g., allows the creation of a non-Gregorian calendar, as described above). The control panel element 136 may provide a graphical user interface to the display 44 of the energy meter 20. The graphical user interface may be useful for controlling attributes of the energy meter 20. In some embodiments, a function 132 may include functionalities to modify the graphical user interface provided by the control panel element 136. For example, the function 132 may enable the customizable instructions 21 to modify the look and feel of the control panel (e.g., add, remove, or modify graphics, colors, text, etc. on the graphical user interface). In certain embodiments, the customized instructions 21 may enable the graphical user interface to be translated or localized for specific languages or geographies. The clock element 138 may provide a system-time to the API 63. The memory management element 140 may provide access to data stored in the memory 48 of the energy meter 20. Further, functionalities of the memory management element, such as archival and data access authentication may be modified through use of customizable instructions 21 through the API 63. The load profile element 142 may provide the load monitoring for the energy meter 20 over time. The load profile element 142 may enable a more accurate prediction of equipment demands. The time of use element 144 may provide the energy usage for a specific time period. The time of use element may be useful for determining billing for a calendar day, month, or year.

The functions contained in the library 100 and the elements 116 of the firmware 47 discussed above are only a representation of functions and elements that may be available in the library 100. As illustrated in FIG. 3, many other functions 132 may be present in the library 100. Further, many other elements 116 of the firmware 47 may interact with the API 63. Indeed, any number of other functions 132 may be provided in the library 100 to affect the elements 116 of the firmware 47. Further, the customizable instructions 21 are not limited to using one function 132 or accessing/modifying only one element 116 at time. For example, an energy meter 20 consumer may wish to provide billing for the energy meter 20 in a lunar calendar. Thus, the consumer may generate customizable instructions 21 in the SDK 106 that access the "modify calendar" function 126 which accesses the calendar element 134. The customizable instructions 21 may then provide source code 108 that converts the calendar element 134 into a lunar calendar. Further, the source code 108 may include instructions to access the time of use element 144 to obtain billing information, and may also include instructions to add the billing information to the lunar calendar. The customizable instructions 21 may also include instructions to use the "inject out" function 124 to inject the lunar calendar billing into an outgoing communication from the energy meter 20.

FIG. 4 is a flowchart depicting a process 200 for executing customizable instructions 21 on an energy meter 20. The energy meter 20 may receive customizable instructions 21 (block 202). For example, the energy meter 20 may receive the customizable instructions 21 through the communications device 60 or the I/O port 62. In some embodiments, the customizable instructions 21 may be detected by detecting a data stream containing the customizable instructions 21. In some embodiments, only a portion of the data stream may contain customizable instructions 21. The data stream may include a start flag and an end flag. The customizable instructions 21 may be determined by interpreting the data between the start and end flags as the customizable instructions 21.

The customizable instructions are interpreted (block 204). For example, the customizable instructions 21 are sent in a format that firmware 47 understands. The firmware 47 may determine elements 116 and functions of library 100 that may be invoked by the customizable instructions 21. The customizable instructions 21 are then implemented by the firmware 47 (block 206). For example, the firmware 47 may utilize the functions of library 100 and elements 116 to provide the customized functions provided by the customizable instructions 21.

Technical effects of the invention include an energy meter enabled to implement customizable instructions 21 that add to or modify the basic functionalities of the firmware of energy meters. Thus, the customizable instruction-enabled energy meters may enable a consumer to create and customize a variety of functionalities after the firmware has been released. Such customizable instruction energy meters not only provide increased usability for the energy meter consumers, but also provide an increased benefit to energy meter manufacturers who may be enabled to provide some customizations for consumers without having to create an additional firmware version.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An energy meter comprising:
    metering circuitry configured to monitor energy consumption;
    memory storing firmware comprising internal function configured to control elements of the metering circuitry;
    an input/output port or a communications device configured to receive customized instructions; and
    a processor configured to:
    control the metering circuitry;
    receive the customized instructions from the input/output port or the communications device, wherein the customized instructions are configured to provide additional control of the elements of the metering circuitry beyond the internal functions of the firmware;
    interpret the customized instructions; and
    execute the customized instructions utilizing the internal functions of the firmware by injecting information into an incoming or an outgoing communication from the input/output port or the communications device, wherein the information injected into the incoming or the outgoing communication is based at least in part on the customized instruction, wherein the information comprises a tag configured to provide a destination for the outgoing communication.

2. The energy meter of claim 1, wherein the elements comprise a clock configured to provide a system time for the energy meter, and wherein the processor is configured to execute the customized instructions based at least in part on the system time.

3. The energy meter of claim 1, wherein the elements comprise a calendar element, and wherein the processor is configured to execute the customized instructions based at least in part on the calendar element.

4. The energy meter of claim 3, wherein the customized instructions comprise instructions for converting the internal calendar configured in a first format to a customized calendar configured in a second format.

5. The energy meter of claim 4, wherein the first format comprises a Gregorian calendar and second format comprises a lunar or non-Gregorian calendar.

6. The energy meter of claim 1, wherein the elements comprise a control panel control element configured to provide a graphical user interface on a control panel of the energy meter, wherein the processor is configured to execute the customized instructions based at least in part on the control panel control element.

7. The energy meter of claim 6, wherein the customized instructions comprise instructions to translate a language of the graphical user interface from a first language into a second language, to customize a look and feel of the graphical user interface, or both.

8. The energy meter of claim 1, wherein the elements comprise a memory manager element configured to store metering metrics of the energy meter, wherein the processor is configured to execute the customized instructions based at least in part upon the memory manager element.

9. The energy meter of claim 1, wherein the customized instructions comprise instructions to encrypt or decrypt the metering metrics based upon an encryption method not included in the firmware.

10. The energy meter of claim 1, comprising a time of use element configured to provide a billing calendar for the energy meter, wherein the processor is configured to execute the customized instructions based at least in part upon the time of use element.

11. The energy meter of claim 1, wherein the input/output port comprises a portable storage device configured to receive the customized instructions or the communications device comprises a wired or a wireless communications device configured to receive the customized instructions.

12. A method for executing a customized instruction on an energy meter, comprising:
   receiving, at an input/output port or a communications device of the energy meter, the customized instruction;
   detecting, at the input/output port or the communications device, a data stream containing the customized instruction, by:
      detecting a start flag in the data stream;
      detecting an end flag in the data stream;
      receiving all data between the start flag and the end flag; and
      defining the customized instruction based at least in part on the data between the start flag and the end flag;
   interpreting the customized instruction via firmware of the energy meter; and
   executing the customized instruction by utilizing a library of functions of firmware.

13. The method of claim 12, wherein executing the customized instruction comprises injecting information into an incoming or an outgoing communication from the input/output port or the communications device, wherein the information injected into the incoming or the outgoing communication is based at least in part on the customized instruction.

14. The method of claim 13, wherein the information is injected into the outgoing communication and the information comprises a tag configured to provide a destination for the outgoing communication.

15. The method of claim 13, wherein the information comprises a bellwether instruction configured to provide a unique string representing that the energy meter is in a proper functioning state.

16. The method of claim 12, wherein executing the customized instruction comprises modifying an element of the firmware based at least in part upon the customized instruction.

17. The method of claim 12, wherein executing the customized instruction comprises sniffing a specific data string and executing an instruction when the specific data string is detected.

18. An article of manufacture comprising:
   one or more tangible, machine-readable media configured to store processor-executable instructions, the instructions comprising:
   instructions to provide a user interface to enable creation of customizable instructions, wherein the user interface comprises:
   source code comprising functions to enable creation of the customizable instructions;
   a compiler configured to transform the source code into a language understandable by an application programming interface (API) of a smart meter;
   a linker configured to transform an output of the compiler into an executable program;
   a builder configured to provide a graphical user interface to visually develop the customizable instructions; or
   a combination thereof;
   wherein the customizable instructions are interpretable and executable by a processor of an energy meter when the energy meter sniffs a specific data string and wherein the customizable instructions enable customizable functionality beyond originally programmed functions of a firmware of the smart meter.

* * * * *